United States Patent [19]
Button et al.

[11] Patent Number: 5,406,411
[45] Date of Patent: Apr. 11, 1995

[54] FIBER AMPLIFIER HAVING EFFICIENT PUMP POWER UTILIZATION

[75] Inventors: Leslie J. Button, Big Flats; Mark A. Newhouse, Corning, both of N.Y.

[73] Assignee: Corning Incorporated, Corning, N.Y.

[21] Appl. No.: 137,270

[22] Filed: Oct. 14, 1993

[51] Int. Cl.$^6$ ............................................. H01S 3/30
[52] U.S. Cl. ................................. 359/341; 359/344
[58] Field of Search ............................... 359/341, 344

[56] References Cited

U.S. PATENT DOCUMENTS

| | | | |
|---|---|---|---|
| 5,050,949 | 9/1991 | DiGiovanni et al. | 359/341 |
| 5,115,338 | 5/1992 | DiGiovanni et al. | 354/341 X |
| 5,173,957 | 12/1992 | Bergano et al. | |
| 5,177,634 | 1/1993 | Way | 359/341 |
| 5,185,814 | 2/1993 | Healey | 359/341 |
| 5,233,463 | 8/1993 | Grasso et al. | 359/341 |
| 5,280,383 | 1/1994 | Federici et al. | 359/341 |
| 5,301,054 | 4/1994 | Huber et al. | 359/132 |

OTHER PUBLICATIONS

High-Sensitivitiy Two-Stage Erbium-Doped Fiber Preamplifier at 10 Gb/s, IEEE Photonics Technology Letters, vol. 4, No. 12, Dec. 1992, pp. 1348-1340.

*Primary Examiner*—Mark Hellner
*Attorney, Agent, or Firm*—W. J. Simmons, Jr.

[57] ABSTRACT

The present invention relates to a multi-stage fiber amplifier in which the first and stages are connected by means including a filter for attenuating the amplified spontaneous emission. The pump source consists of a pair of light sources that are connected to a coupler that splits the power equally to two output legs. All of the pump power from the second coupler output leg is supplied to the second stage. A portion of the pump power from the second coupler output leg is converted in the first stage to amplified signal and amplified spontaneous emission, and the remainder of the power from that leg is supplied to the second stage.

9 Claims, 3 Drawing Sheets

FIBER AMPLIFIER HAVING EFFICIENT PUMP POWER UTILIZATION

BACKGROUND OF THE INVENTION

The present invention relates to an optical amplifier for optical communications, and more particularly, to a multi-stage fiber amplifier in which the total available pump power, which is supplied from a single source, is optimally divided between the stages to provide maximum gain and minimum noise for a given spectral response.

High output power amplifiers are required for many applications, including, for example, multi-wavelength systems. One of the key performance characteristics of an amplifier is its output power, which is largely governed by how efficiently the pump light is converted into signal light.

FIG. 1 schematically illustrates that at the input of gain fiber 10 both the signal and the spontaneous emission (SE) are available to be amplified. The amount of SE that is amplified must be reduced relative to the amount of signal that is amplified so that signal amplification dominates in the utilization of pump power. The size of the signal is typically set by the system link loss and therefore cannot be increased. The amount of amplified spontaneous emission (ASE) could be reduced by reducing the total pump power. However, there would then be less pump power available for conversion to signal power. Since the erbium-doped fiber amplifier has utility in communication systems operating at 1550 nm, that fiber amplifier is specifically discussed herein by way of example. The invention also applies to fiber amplifiers containing gain ions other than erbium, since ASE also diverts pump power from the signal in amplifiers utilizing gain ions other than erbium. As shown by curve 18 of FIG. 2, the gain spectrum of a highly inverted erbium-aluminum-doped germania silicate fiber amplifier has a peak around 1532 nm and a broad band with reduced gain to about 1560 nm. Some prior art fiber amplifiers included means for reducing the 1532 nm peak to prevent the occurrence of such disadvantageous operation as wavelength dependent gain or gain (with concomitant noise) at unwanted wavelengths. The resultant gain spectrum might be as represented by curve 19, for example.

In one such fiber amplifier, a filter such as a fiber containing ions that absorb at the ASE wavelength is connected between two sections of gain fiber. The ASE is filtered from the output of the first gain fiber section by the ASE-absorbing fiber, and the resultant signal light is amplified by the second gain fiber section. Both the signal and pump light are introduced into the first gain fiber section, and the remnant pump light at the output of the first gain fiber section is used to pump the second gain fiber section. The lengths of gain fiber at both ends of the filter determine the amplifier gain and spectral response.

A modification of the above-described amplifier is described in the publication, R. I. Laming et al. "High-Sensitivity Two-Stage Erbium-Doped Fiber Preamplifier at 10 Gb/s", IEEE Photonics Technology Letters, vol. 4, No. 12, December 1992, pp. 1348-1340. In the fiber amplifier disclosed in that publication, the ASE absorbing fiber of the above-described amplifier is replaced by a 1536 nm isolator for suppressing the backward-traveling ASE. Since the isolator has a very high loss at the 980 nm pump wavelength, two wavelength division multiplexer (WDM) couplers are included in the circuit to provide a low-loss pump power bypass around the isolator.

Another fiber amplifier having ASE filtering is described in the publication "High Gain Two-Stage Amplification with Erbium-Doped Fibre Amplifier" by H. Masuda et al., Electronics Letters, 10 May 1990, vol. 26, No. 10, pp. 661-662. The ASE filter is connected between two fiber amplifier stages. Separate pump sources are connected to the two stages, the second stage being double pumped from two separate sources, whereby it receives more pump power than the first stage. The signal is amplified by the first fiber amplifier stage. The ASE wavelengths in the output of that amplifier are filtered, and the resultant signal is connected to the second amplifier stage. Since the input signal is relatively small, much of the pump power will be converted to ASE in the first stage. With the ASE filter in place, this ASE optical power is lost, as it does not reach the second stage. Therefore, in this type of configuration, the amount of power converted to ASE is minimized by reducing the ASE build up in the first stage by limiting the amount of pump power supplied to the first stage. In this kind of fiber amplifier, the pump conversion is enhanced, but a large number of pump sources is required.

U.S. Pat. No. 5,050,949 also teaches a two-stage fiber amplifier in which unequal pump power is supplied to each of the two stages. The gain spectrums of the two gain fibers are made different by selecting gain fibers having different host glasses and/or different gain ions. Since the gain spectrums of the two stages are different, signal gain equalization is achieved, rather than optimization of pump power conversion.

SUMMARY OF THE INVENTION

It is therefore an object of the present invention to provide a multi-stage fiber amplifier in which pump power from a single source is unequally coupled to the two stages in such a manner that output power is optimized for a given spectral response. Another object is to provide a fiber amplifier that overcomes the disadvantages of prior art devices.

Briefly, the present invention relates to a fiber amplifier comprising first and second fiber amplifier stages, the output spectrum from the first stage including a first band of wavelengths that is primarily attributable to ASE. The first and second stages are connected by means including a filter for attenuating the first band of wavelengths. Distribution means connects pump light from a source to the first and second stages such that less than half of the pump power is converted to signal and amplified spontaneous emission in the first amplifier stage.

In one embodiment the pump source consists of a pair of light sources connected to a coupler that splits the power equally to two output legs. All of the pump power from the second coupler output leg is supplied to the second stage. A portion of the pump power from the second coupler output leg is converted in the first stage to amplified signal and ASE, and the remainder of the power from that leg is supplied to the second stage.

DESCRIPTION OF THE PREFERRED EMBODIMENTS

To maximize the pump-to-signal conversion efficiency, the amount of light converted to ASE should be minimized. In accordance with this invention, pump power from a single source is divided such that pump power consumption is reduced in the primary stage of the amplifier, thus reducing the power converted to ASE. Excess pump power is directed to a later stage in the amplifier where the signal will be larger and better conversion efficiency can be attained.

Figure 1:
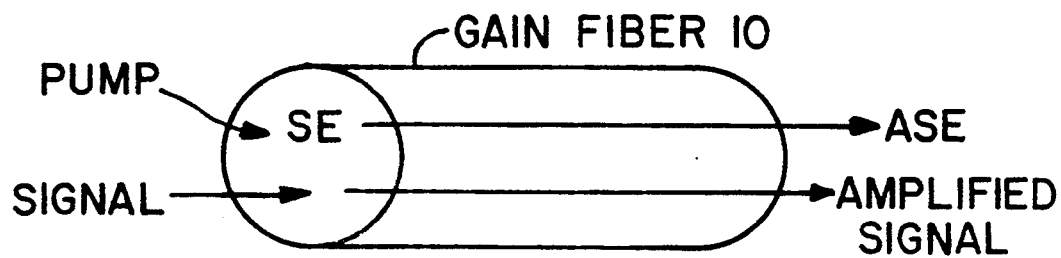
FIG. 1 is a schematic illustration of a gain fiber.
Figure 2:
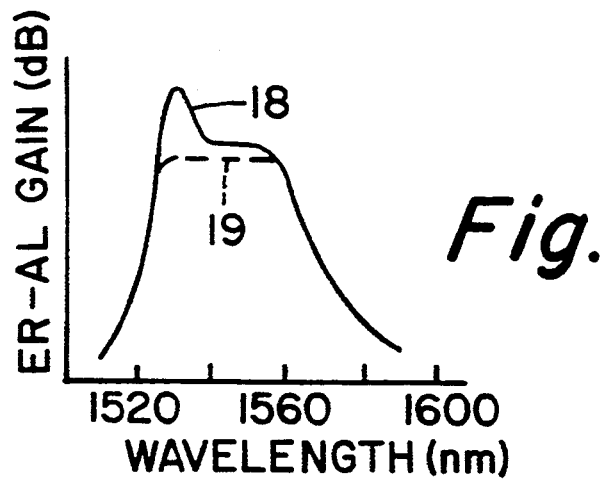
FIG. 2 is a graph showing the gain spectrum of an erbium-aluminum-doped germania silicate fiber amplifier.
Figure 3:
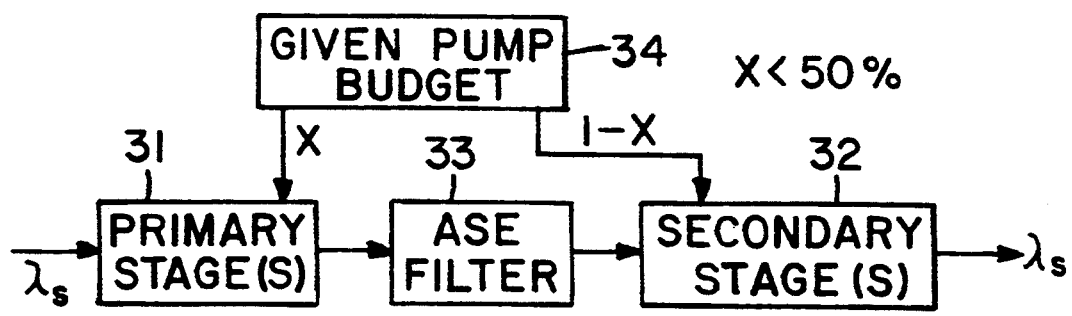
FIG. 3 is a schematic illustration of a fiber amplifier in accordance with the present invention.

A basic schematic diagram of the invention is shown in FIG. 3. The amplifier comprises a primary stage 31 which is connected to a secondary stage 32 by an ASE filter 33. ASE filter 33, as well as the ASE filters of later described amplifiers, can be one that diverts light between 1530–1540 nm to an output telemetry port. It is in this spectral region that the peak of ASE emission is found for a fully inverted amplifier. A given pump budget is available from pump source 34. A given amount x of the available pump power is supplied to stage 31, wherein x is less than 50%. The remaining (1−x) of the available power is supplied to stage 32. The value of x is typically between about 10% and 49%. At values below 10%, the noise performance is seriously degraded. There is obviously not much improvement in efficiency of pump-to-signal conversion when x is 49%. The value of x is thus often selected to be between about 20% and 30%. To determine the value of x for a given amplifier, the amount of amplifier noise that can be tolerated in the system is initially determined. The gain is then optimized for that noise performance by appropriately apportioning the pump power budget to the first and second amplifier stages.

Figure 4:
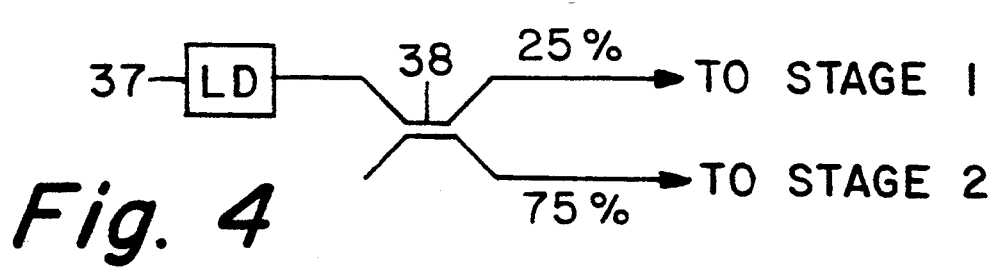
FIG. 4 is a schematic illustration showing division of pump power.

As shown in FIG. 4, the pump source may be a laser diode 37 connected to stages 1 and 2 by a coupler 38 that splits the pump power such that, at the pump wavelength, less than half (e.g. 25%) of the power is supplied to stage 1, The remainder of the pump power being directed to the second stage. This configuration requires few components, but it does not provide the amplifier with the soft fail function which will be described in the remaining embodiments.

Figure 5:
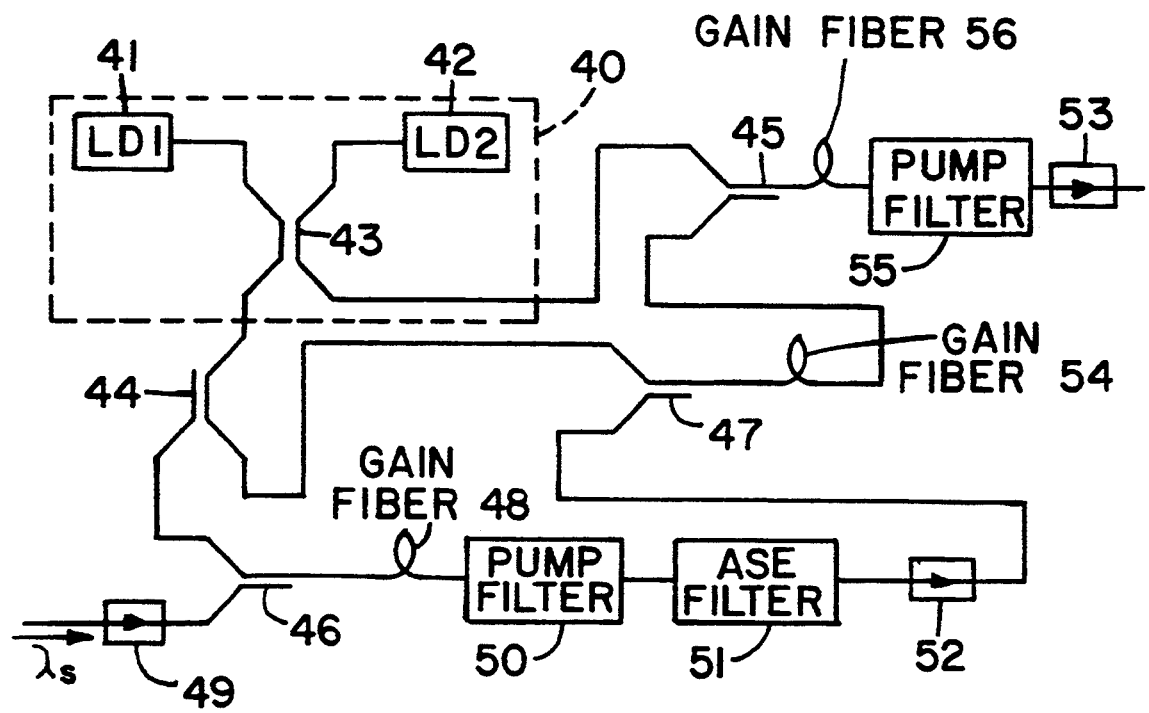
FIGS. 5, 6 and 7 are schematic illustrations of embodiments of the invention.

FIG. 5 illustrates a multi-stage fiber amplifier that is pumped by a single source which divides the pump power between the stages so that the amplifier achieves efficient pump power-to-signal conversion efficiency. Laser diodes 41 and 42 of source 40 are connected to a 3 dB coupler 43 which provides equal amounts of pump power to 3 dB coupler 44 and wavelength division multiplexer (WDM) coupler 45. The gain of the amplifier will drop by no more than 3 dB if one of the sources fails, because to the use of coupler 43 in the pump source. Without this soft fail architecture, the gain will drop by more than 3 dB when one of the pump diodes fails. Coupler 44 provides equal amounts of pump power to WDM couplers 46 and 47. The signal of wavelength $\lambda_s$, which is applied to coupler 46, is amplified by first fiber amplifier stage 48. The amplified signal is connected to gain fiber 54 by pump filter 50, ASE filter 51, isolator 52 and WDM coupler 47. Pump filter 50 is employed when ASE filter 51 is of the type whose performance is degraded by pump light. The amplified signal from gain fiber 54 is connected to gain fiber 56 by WDM coupler 45. The pump-to-signal conversion efficiency is improved in this embodiment by employing only 25% of the pump power in the first stage 47, and supplying 75% of the pump power to the stage including gain fibers 54 and 56, which is located after ASE filter 51. Isolators 49, 52 and 53 suppress reflection noise. An optional pump filter 55 protects downstream elements from pump light that might be deleterious thereto.

Comparison Amplifier 1 was constructed to evaluate the performance of the amplifier of FIG. 5. Comparison Amplifier 1 was similar to the amplifier of FIG. 5 except that the second stage consisted of a single gain fiber and the pump power was supplied to the two stages directly from source 40, i.e. each stage received 50% of the available power. The output power of the amplifier constructed in accordance with FIG. 5 was more than 1.5 dB larger than the output power of Comparison Amplifier 1.

An accurate numerical model was constructed for the amplifier of FIG. 5 and for Comparison Amplifier 1. It showed that the output power of an amplifier constructed in accordance with FIG. 5 would have 1.4 dB greater output power than Comparative Amplifier 1 at equivalent noise and gain spectrum.

Figure 6:
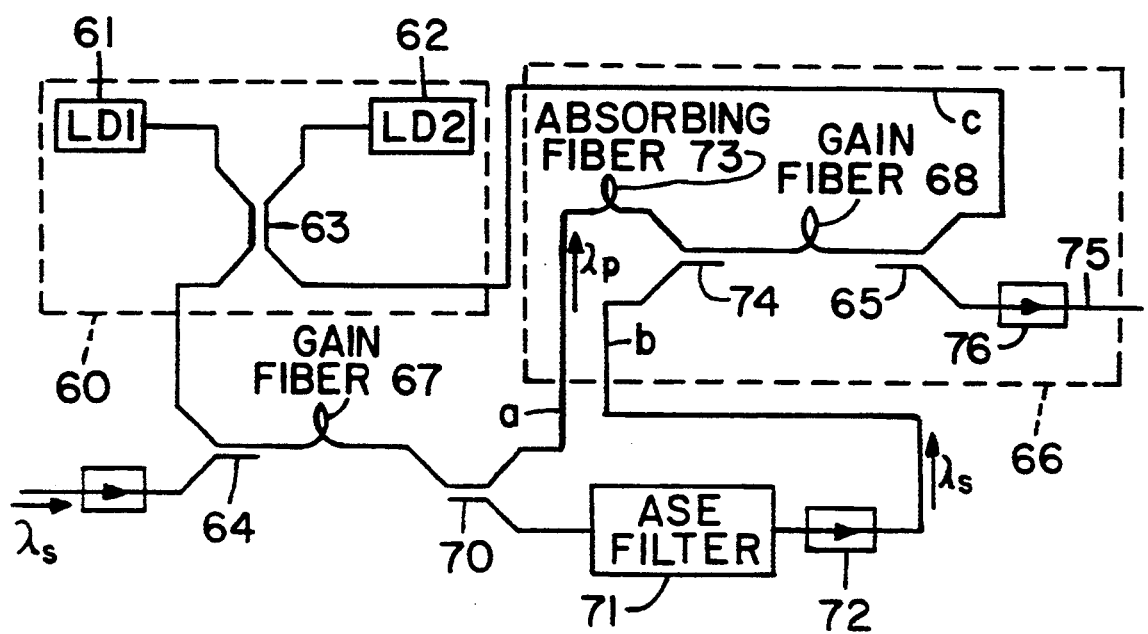

In FIG. 6 laser diodes 61 and 62 are connected to a 3 dB coupler 63 which provides equal amounts of pump power to WDM couplers 64 and 65. The signal of wavelength $\lambda_s$, which is applied to coupler 64, is amplified by a first fiber amplifier stage comprising gain fiber 67. The amplified signal is connected to gain fiber 68 by WDM coupler 70, ASE filter 71, isolator 72 and WDM coupler 74. The length of first stage gain fiber 67 is insufficient to convert all of the pump power supplied thereto by couplers 63 and 64 to signal and ASE. Gain fiber 67 might absorb only 50% of the pump power, for example. The remnant pump power from gain fiber 67 is connected to coupler 74 by coupler 70; this pump power pumps gain fiber 68 in the forward direction. Gain fiber 68 is also pumped in the reverse direction by the pump power supplied to it from coupler 65. The amplified signal is coupled from gain fiber 68 to output fiber 75 by WDM coupler 65 and isolator 76. If, as suggested above, gain fiber 67 absorbs only 50% of the pump power supplied to it, then gain fiber 67 utilizes essentially 25% of the available pump power budget from source 60, and gain fiber 68 utilizes essentially 75% of the available pump power budget from source 60. As discussed above, this division of pump power improves the pump-to-signal conversion efficiency.

Due to the finite signal crosstalk of WDM couplers 70 and 74, some signal light leaks into the pump path a. This signal will be out of synchronization with the principle signal from path b where the paths rejoin at coupler 74 due to inevitable small differences in path length between the two paths. This unsynchronized signal will be a source of added noise. It has been calculated that with WDM couplers 70 and 74 having 15 dB crosstalk at the signal wavelength, this 30 dB attenuated signal will degrade the noise figure by as much as 26 dB, when the path lengths differ by more than the source coherence length. To block this secondary signal path, which would ordinarily occur through pump path a, a signal attenuating fiber 73 is added to path a. It has been calculated that 60 dB signal attenuation in path a would eliminate this additional source of noise. If the gain fibers were erbium-doped, the filtering function could easily be obtained with one meter of praseodymium-doped fiber, for example.

Figure 7:
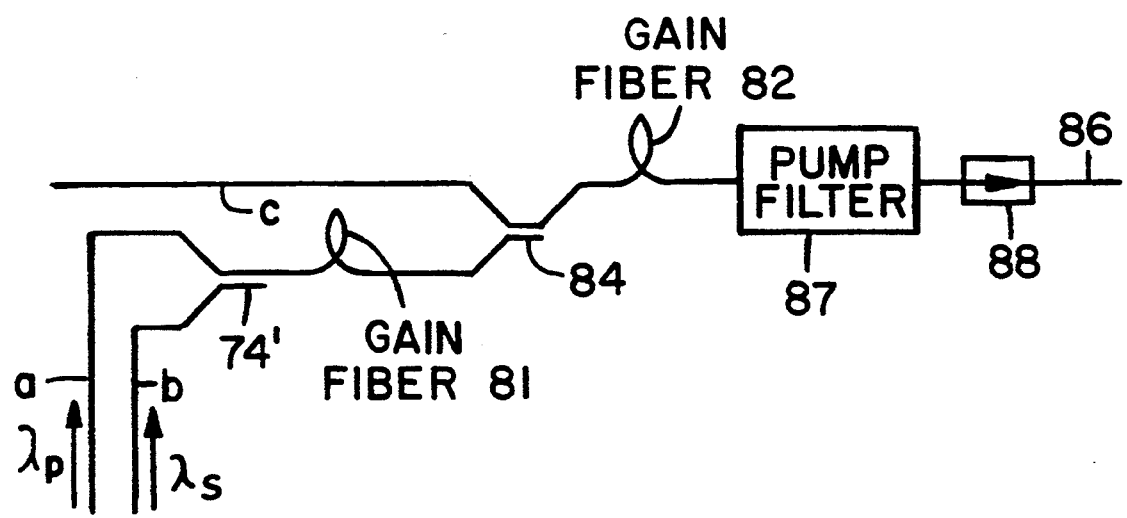

FIG. 7 shows an alternate design for the second stage 66 of FIG. 6. Gain fiber 68 is replaced by two gain fibers 81 and 82. Connecting fibers a, b and c, which enter second stage 66 of FIG. 6, are also shown in FIG. 7. Gain fiber 81 is pumped in the forward direction by pump power supplied thereto via connecting fiber a and WDM coupler 74'. The pump power from connecting fiber c and the amplified signal from gain fiber 81 are coupled to gain fiber 82 by WDM coupler 84, whereby gain fiber 82 is also forward pumped. The amplified output is connected to output fiber 86 by pump filter 87 and isolator 88.

An accurate numerical model was also constructed for the amplifier of FIG. 7. It showed that the output power of an amplifier constructed as in FIG. 7 would have 1.9 dB greater output power than Comparative Amplifier 1 at equivalent noise and gain spectrum.

We claim:

1. A fiber amplifier comprising
   a first fiber amplifier stage, the output spectrum from said first stage including a first band of wavelengths that is primarily attributable to amplified spontaneous emission,
   a second fiber amplifier stage,
   connecting means, including a filter for attenuating said first band of wavelengths, for connecting said first stage to said second stage,
   a source of pump light for supplying a given amount of pump power and,
   distribution means for connecting pump light from said source to said first stage and said second stage such that x % of said pump power is converted to signal and amplified spontaneous emission in said first amplifier stage, wherein x % is less than half of said given pump power, and (1−x)% of said pump power is supplied to said second stage.

2. A fiber amplifier in accordance with claim 1 wherein said first stage comprises a gain fiber, the length of which is insufficient to convert the pump power supplied thereto to amplified signal and amplified spontaneous emission, said distribution means including means for connecting pump light from the output of said first stage to said second stage.

3. A fiber amplifier comprising
   a first fiber amplifier stage,
   a second fiber amplifier stage,
   connecting means for connecting said first stage to said second stage,
   means in said connecting means for attenuating amplified spontaneous emission appearing at the output of said first amplifier stage,
   a source of pump light having two output legs at which equal amounts of pump power appear,
   means for connecting all of the light from said second source output leg to said second stage,
   means for connecting a portion of the light from said first source output leg to said first stage, and
   means for connecting the remainder of the light from said first source output leg to said second stage.

4. A fiber amplifier comprising
   a first fiber amplifier stage, the output spectrum from said first stage including a first band of wavelengths that is primarily attributable to amplified spontaneous emission,
   a second fiber amplifier stage,
   connecting means, including a filter for attenuating said first band of wavelengths, for connecting said first stage to said second stage,
   a single light emitting diode, and
   coupler means for unequally splitting the pump light from said diode to first and second output legs, said first output leg being connected to said first stage and said second output leg being connected to said second stage, said coupler means being such that less than half of said pump power is converted to signal and amplified spontaneous emission in said first amplifier stage.

5. A fiber amplifier comprising
   a first fiber amplifier stage, the output spectrum from said first stage including a first band of wavelengths that is primarily attributable to amplified spontaneous emission,
   a second fiber amplifier stage,
   connecting means, including a filter for attenuating said first band of wavelengths, for connecting said first stage to said second stage,
   a first coupler having two input legs and two output legs, the characteristics of said first coupler being such that substantially one-half the power supplied to each of said first coupler input legs is coupled to each of said first coupler output legs,
   first and second sources of pump light respectively connected to said first and second input legs,
   means for connecting all of the pump light from said second coupler output leg to said second stage,
   means for connecting a portion of the pump light from said first coupler output leg to said first stage, and
   means for connecting the remainder of the pump light from said first coupler output leg to said second stage, less than half of the pump power available from said first and second sources of pump light being converted to signal and amplified spontaneous emission in said first amplifier stage.

6. A fiber amplifier comprising
   a first fiber amplifier stage, the output spectrum from said first stage including a first band of wavelengths that is primarily attributable to amplified spontaneous emission,
   a second fiber amplifier stage,
   connecting means, including a filter for attenuating said first band of wavelengths, for connecting said first stage to said second stage,
   a first coupler having two input legs and two output legs, the characteristics of said first coupler being such that substantially one-half the power supplied to each of said first coupler input legs is coupled to each of said first coupler output legs,
   first and second sources of pump light respectively connected to the first and second input legs of said first coupler,
   means for connecting the second output leg of said first coupler to said second stage,
   a second coupler having an input leg and two output legs, the characteristics of said second coupler being such that a portion of the power supplied to said second coupler input leg is coupled to the first output leg of said second coupler, the remainder of the power supplied to said second coupler input leg being coupled to the second output leg of said second coupler, means for connecting said second coupler input leg to the first output leg of said first coupler, means for connecting the first output leg of second coupler to said first stage, and means for connecting the second output leg of said second coupler to said second stage, less than half of the pump power available from said first and second sources of pump light being converted to signal and amplified spontaneous emission in said first amplifier stage.

7. A fiber amplifier comprising a first fiber amplifier stage including a first gain fiber having first and second ends, the output spectrum from said first stage including a first band of wavelengths that is primarily attributable to amplified spontaneous emission, a second fiber amplifier stage, a wavelength division multiplexer coupler having an input leg and first and second output legs, said input leg being connected to the second end of said first gain fiber, the first output leg of said multiplexer coupler being coupled to said second stage, a filter for attenuating said first band of wavelengths, said filter connected between the second output leg of said multiplexer coupler and said second stage, a source of pump light, distribution means for connecting pump light from said source to said first stage and said second stage, the length of said first gain fiber being insufficient to convert the pump power supplied thereto to signal and amplified spontaneous emission, the first output leg of said multiplexer coupler coupling the nonconverted pump power from the second end of said first gain fiber to the second end of said second gain fiber, less than half of the pump power available from said source of pump light being converted to signal and amplified spontaneous emission in said first amplifier stage.

8. A fiber amplifier comprising a first gain fiber having first and second ends, the output spectrum of said first gain fiber including a first band of wavelengths that is primarily attributable to amplified spontaneous emission, a second gain fiber having first and second ends, a wavelength division multiplexer coupler having an input leg connected to the second end of said first gain fiber, a first output leg of said multiplexer coupler being connected to the first end of said second gain fiber, a filter for attenuating said first band of wavelengths, said filter connecting a second output leg of said multiplexer coupler to the second end of said second gain fiber, a source of pump light, and a power splitting coupler for apportioning the power from said source to first and second output legs, the second output leg of said power splitting coupler being connected to the second end of said second gain fiber, the first output leg of said power splitting coupler being connected to the first end of said first gain fiber, the length of said first gain fiber being insufficient to convert the pump power supplied thereto to signal and amplified spontaneous emission, the first output leg of said multiplexer coupler coupling the nonconverted pump power from the second end of said first gain fiber to the second end of said second gain fiber, less than half of the pump power available from said source of pump light being converted to signal and amplified spontaneous emission in said first amplifier stage.

9. A fiber amplifier comprising a first fiber amplifier stage having a first gain fiber, the output spectrum from said first stage including a first band of wavelengths that is primarily attributable to amplified spontaneous emission, a second fiber amplifier stage comprising the serial connection of second and third gain fibers, a wavelength division multiplexer coupler having an input leg connected to the second end of said first gain fiber, a first output leg of said multiplexer coupler being connected to the first end of said second gain fiber, a filter for attenuating said first band of wavelengths, said filter connecting a second output leg of said multiplexer coupler to said second gain fiber, a pump light source, and a power splitting coupler for apportioning the power from said source to first and second output legs, the second output leg of said power splitting coupler being connected to said third gain fiber, the first output leg of said power splitting coupler being connected to the first end of said first gain fiber, the length of said first gain fiber being insufficient to convert the pump power supplied thereto to signal and amplified spontaneous emission, the first output leg of said multiplexer coupler coupling the nonconverted pump power from the second end of said first gain fiber to the second end of said second gain fiber, less than half of the pump power available from said source of pump light being converted to signal and amplified spontaneous emission in said first amplifier stage.

* * * * *